No. 822,806. PATENTED JUNE 5, 1906.
T. A. WILLSON.
SPECTACLES.
APPLICATION FILED MAR. 6, 1905.
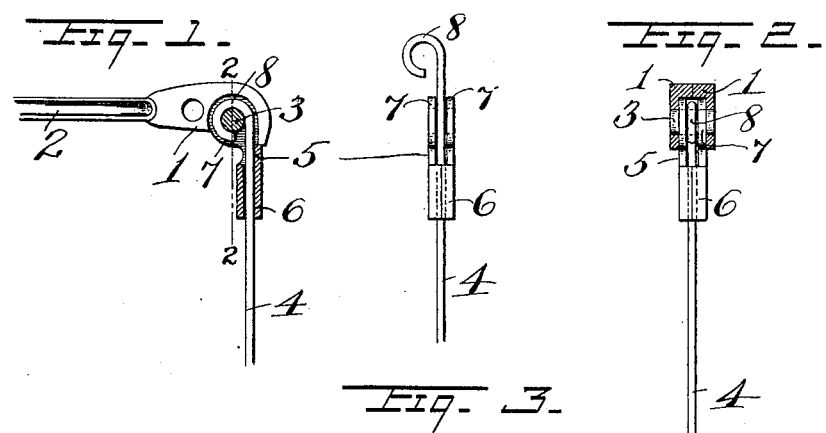
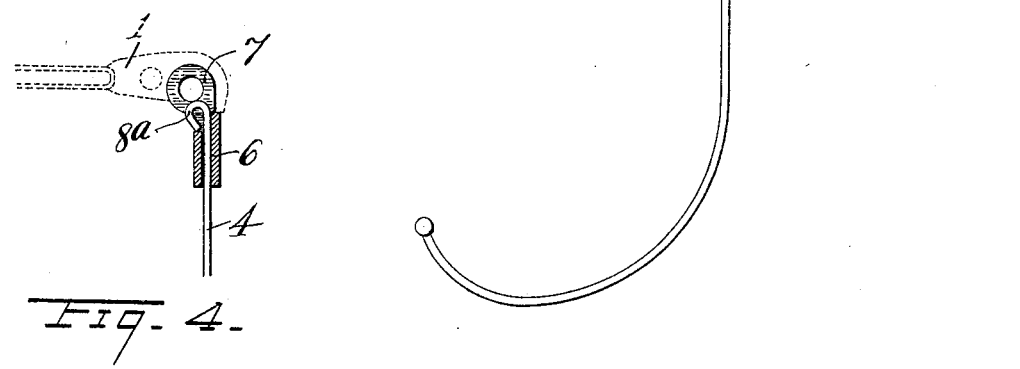

UNITED STATES PATENT OFFICE.

THOMAS A. WILLSON, OF READING, PENNSYLVANIA.

SPECTACLES.

No. 822,806.　　　Specification of Letters Patent.　　　Patented June 5, 1906.

Application filed March 6, 1905. Serial No. 248,415.

*To all whom it may concern:*

Be it known that I, THOMAS A. WILLSON, a citizen of the United States, residing in the city of Reading, county of Berks, State of Pennsylvania, have invented certain new and useful Improvements in Spectacles, of which the following is a specification.

My invention relates to spectacles; and it consists in the improved construction and arrangement of the temples thereof, as fully described in connection with the accompanying drawings, and specifically pointed out in the claims.

Figure 1 is an enlarged sectional elevation showing a preferred form of temple embodying my invention, in connection with part of a temple-joint end. Fig. 2 is a view of the same, taken at right angles to Fig. 1, the temple-joint end being shown in cross-section on the line 2 2 of Fig. 1. Fig. 3 shows the temple separately, the pivot-piece portion thereof being shown out of the normal operative position upon the shaft portion in which it is indicated in Figs. 1 and 2. Fig. 4 shows a slight modification.

The drawings indicate a temple-joint end of spectacles, marked 1, on an eye-wire 2, adapted to receive the pivot-piece of a temple arranged to turn upon a pivot-pin 3, such temple-joint end being shown as illustrating the general form to which my invention is applicable. My improved temple is made up of two separately-formed parts, a shaft 4 and pivot-piece 5, as usual, the invention consisting in the improved connection whereby practical rigidity of the temple parts is secured when it is pivotally fastened to the spectacle end piece. The pivot-piece 5, as shown in the drawings, is formed of sheet metal, substantially as described in Patent No. 536,248, issued to me March 26, 1895, such specific construction being merely illustrative of the features essential to the embodiment of my invention. The temple-shaft 4 enters the hollow shank 6 of the pivot-piece 5 and is reenforced thereby, as heretofore, while the pivot end of said pivot-piece engages the pivot-pin 3 by means of pivot-ears 7, as shown, spaced apart to fit in the spectacle end piece 1 1. In assembling the temple parts 4 and 5 the shaft 4 is extended through the shank portion 6 of the pivot-piece 5 and the projected end thereof is so shaped as to form a stop 8 beyond said shank portion, said stop being preferably formed by bending the projected end of the shaft and by so forming an eye adapted to lie between the spaced-apart ears 7 in line with the pivot-pin 3, so that the latter may be passed through said eye, thereby pivoting the shaft 4 to said pin directly as well as indirectly through the pivot-piece 5. It will readily be seen that when the temple connection is made to the spectacle end piece 1 the temple-shaft 4 will be positively held against either endwise or turning movement in its end piece 5, regardless of any looseness of the latter upon the shaft, thus permitting these parts to be assembled and finished with facility and certainty of satisfactory results. Moreover, in the preferred construction shown both the pivotal connection and the appearance of the finished product are improved by the eye engagement of the projected end of the shaft 4 with the pivot-pin 3.

The specific construction shown and described may readily be modified within the spirit of my invention, as indicated, for instance, in the simple modification illustrated in Fig. 4, in which the stop $8^a$, formed on the projected end of the shaft 4, is not made to engage the pivot-pin, as shown in the preferred construction.

What I claim is—

1. A spectacle-temple comprising a temple wire or shaft, and a separately-formed pivot-piece having a pin-engaging ear and a shank portion inclosing said shaft, the extremity of said shaft being projected through said shank portion and shaped to form a stop to turning movement of the pivot-piece thereon.

2. In spectacles having temple-joint ends, a temple pivoted thereto comprising a separately-formed pivot-piece having a pin-engaging ear and a hollow shank, and a shaft passed through said shank and having its projected end headed to contact laterally with said pivot-ear and prevent rotary movement of the inserted shaft.

3. In spectacles having temple-joint ends, a temple pivoted thereto comprising a separately-formed pivot-piece having a pin-engaging ear and a hollow shank and a shaft passed through said shank and having an eye-head formed on its projected end, said eye-head lying parallel to said pivot-ear and engaging the pivot-pin passed therethrough.

4. In spectacles having temple-joint ends, a temple pivoted thereto comprising a separately-formed pivot-piece having a pin-engaging ear and a hollow shank and a shaft passed through said shank and having an open-loop head formed on its projecting end, said open-loop head lying parallel to said pivot-ear and forming a friction-ring upon the pivot-pin passed therethrough.

5. In spectacles having temple-joint ends, a temple pivoted thereto comprising a separately-formed pivot-piece having a hollow shank and spaced-apart pivot-ears, and a shaft passed through said shank and having its projected end headed and lying between said pivot-ears.

In testimony whereof I affix my signature in the presence of two witnesses.

THOMAS A. WILLSON.

Witnesses:
D. M. STEWART,
W. G. STEWART.